Aug. 12, 1969 — A. A. JOHNSON — 3,460,641

FLUENT MATERIAL WEIGHING SYSTEM

Filed Dec. 11, 1967

Allie A. Johnson,
INVENTOR.

BY
C. A. Phillips
ATTORNEY.

United States Patent Office 3,460,641
Patented Aug. 12, 1969

3,460,641
FLUENT MATERIAL WEIGHING SYSTEM
Allie A. Johnson, Rte. 1, Pulaski, Tenn. 38478
Filed Dec. 11, 1967, Ser. No. 689,456
Int. Cl. G01g 13/22
U.S. Cl. 177—99                                6 Claims

ABSTRACT OF THE DISCLOSURE

A weighing system which accepts fluent material on a continuous flow basis, then batch weighs the material and finally discharges the material on a continuous flow basis. Alternating weigh chambers are correlated so as to be alternatively filled and discharged onto a conveyor by the use of an electrically controlled, pneumatically operated valving system.

---

This invention relates to devices and systems for weighing fluent materials such as fertilizer and grains and particularly to a system of this category for accurately weighing such material without interruption of the flow of the material.

The weighing of fluent materials such as sand, lime, fertilizer, feed, etc. may be achieved by basically two approaches, continuous weighing as by a belt system where the weight passing a point at a known rate permits calculation of a total weight delivered in a known time, or by "batch" weighing, normally by beam balance systems where a hopper or container is filled, flow shut off, and the batch weighed. In general the continuous weighing systems are more susceptible to error and are principally used for the weighing of less valuable materials, sand, lime, etc. and the batch weighers generally providing greater accuracy are employed for weighing more valuable products such as feed, seed and fertilizer.

The difficulty has been that batch weighing is generally slower than continuous weighing which significantly adds to the cost of handling the latter class of products.

It is an object of the present invention to overcome the difficulties and disadvantages of the prior art by a weighing system which will provide rapid weighing of fluent materials essentially on a continuous flow basis but with the accuracy of batch weighing.

In accordance with the invention two conventional platform scales being scales of the type having balancing arms which reach a horizontal position when material being weighed reach a present weight, are positioned or mounted side by side. A fluent material valve is positioned above two hoppers, the valve being of a Y configuration having an upper inlet and two lower outlets, one outlet being positioned to allow material to flow to a hopper supported by one platform scales and the other outlet being positioned to allow material to flow into the other hopper which is supported by the other platform scales. The outlets of the valve do not actually connect to or touch the hoppers, which enhances accuracy. A movabale discharge gate is incorporated in the valve and selectively positioned to permit flow either down through one outlet or the other. With material fed continuously into the valve inlet there is flow into one hopper until a predetermined weight is reached and then the arm balance of the platform scales holding the first hopper moves to a balanced positioned where it engages an electrical switch positioned on a frame member of the scales. When this occurs the switch energizes control means which shifts the position of the gate valve to close off flow to the first hopper and to initiate flow to the other hopper. At the same time a control means operates a gate valve at the bottom of the first or filled hopper to open it permitting the then "weighed batch" to be fed into a conveyor passing under both hoppers (but not contacting scales) and the material is then moved by the conveyor to truck or other vessel being loaded to a predetermined weight of material. The process continues with the second hopper being filled to a prescribed weight when a switch on the second scales causes the gate valve to return to its original position and the second hopper unloads in the same manner, The gate valve of the first hopper is closed by the same switching action to permit the first hopper to be filled again.

Other objects, features, and advantages of the invention will become more apparent from the following description when considered together with the accompanying drawings in which.

Figure 1:
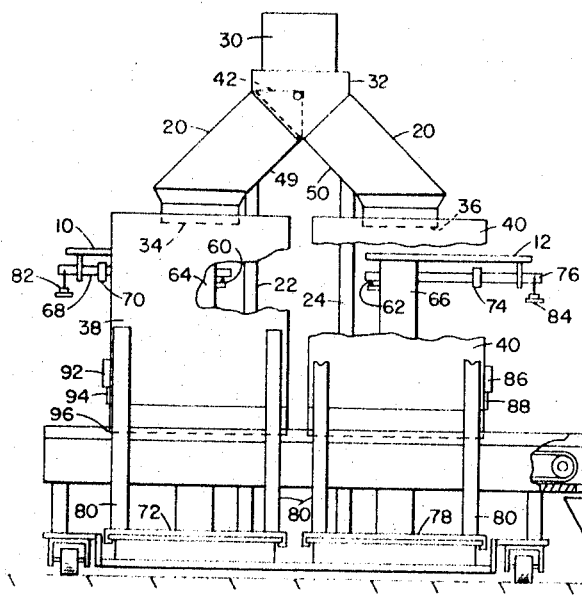
FIG. 1 is a front view of an embodiment of the invention.
Figure 4:
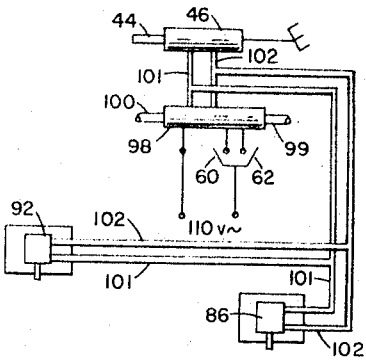
FIG. 4 is a schematic view of the control system of the invention.
Figure 2:
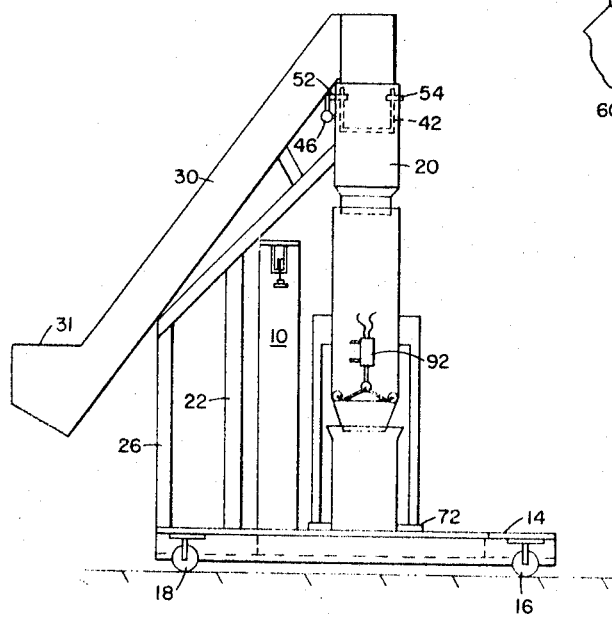
FIG. 2 is a side view of the embodiment of the invention shown in FIG. 1.
Figure 3:
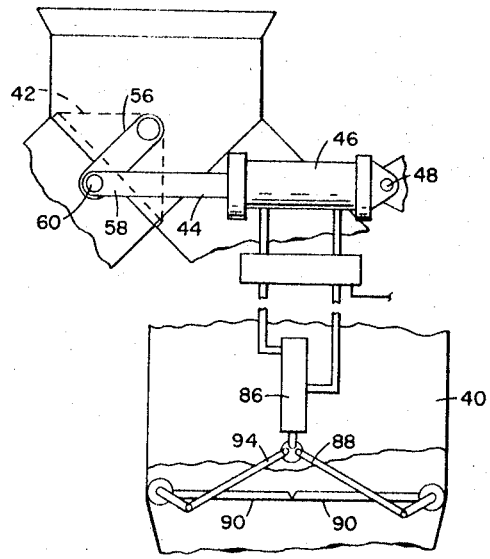
FIG. 3 is a broken view of a portion of the embodiment of the invention shown in FIG. 1.

Referring now to the drawings:

A pair of conventional platform scales 10 and 12 are mounted on a supporting carriage 14, the carriage in turn being supported by front rollers 16 and rear rollers 18. In instances where portability is not of importance and a fixed installation is desired the rollers are omitted. Where employed, rollers 16 or 18 are adapted to swivel to permit ease of moving carriage 14 from place to place. Valve assembly 20 is supported by braces 22, 24, 26 and 28 (not shown but identical to brace 26) extending from carriage 14 to valve assembly 20. Auger 30 (or chute without auger where material is available at elevation to permit gravity flow) provides a flow of material from input hopper 31 to the input end 22 of valve assembly 20. By having a relatively low input hopper 31 the system may be moved from one storage or mixing bin to another. Discharge ends 34 and 36 form the lower portion of valve assembly 20 and provide alternate passageways for material from valve assembly 20 to either of weighing hoppers 28 and 40, selectively, as controlled by movable gate valve 42 positioned within valve assembly 20 and movable by means of piston 44 (FIG. 3) of hydraulic air cylinder 46, pivoted by pin 48 to valve assembly 20. In this manner selective flow is achieved by either opening the passageway 49 from the top of valve assembly 20 to discharge opening 34 and closing the passageway 50 to discharge opening 36 and closing the passageway 49 to opening 34. Movable gate 42 is rotably mounted by means of pins 52 and 54 supported by valve assembly 20, and gate 42 rotates about these pins to open or close the discharge passageways 49 and 50 responsive to arm linkage 56 connected to end 58 of piston 44. Arm linkage 56 and end 58 of piston 44 are connected by means of pin 60 which permits arm linkage 56 to rotate with respect to end 58 of piston 44.

Identical microswitches 60 and 62 are connected on supporting frames 64 and 66 of platform scales 10 and 12, respectively. Switch 60 is positioned to be electrically closed by plunger or lever engagement (both types of switches are commercially available) with balancing arm 68 when balancing arm 68, pivoted at a point (not shown) on supporting frame 64, is precisely horizontal, representing weight balance as determined by conventional weight setting member 70 on arm 68 and a balancing weight applied by filled hopper 38 to platform scales 10. The internal linkage between the weighing platform 72 of scales 10 and arm 70 is conventional and is not shown. Platform scales 12 have an identical arrangement wherein balancing member 74 on arm 76 determines the point of balance for weights applied to weighing platform 78 of scales 12 and controls a like switching system.

Hoppers 38 and 40 to be filled are positioned with their tops above and encircling, without contacting, smaller exit ends or opening 34 and 36 of valve assembly 20 by means of four hopper stanchions 80 supporting each hopper on its respective scales. The weight of each unfilled hopper, or tare, is compensated for by applying appropriate counterweight to counterweight holders 82 and 84.

Air cylinder 86, fixed mounted to hopper 40 operates through linkage 88 to gate valve 90 to open gate valve 90 when microswitch 62 is electrically closed and to close gate valve 90 when microswitch 60 is electrically closed. Similarly, air cylinder 92 is fixed mounted to hopper 38 and operates through identical linkage 94 to an identical gate valve 96 to open gate valve 96 when microswitch 60 is electrically closed and to close gate valve 96 when microswitch 62 is electrically closed. Air cylinders 46, 86 and 92 are powered by a four-way solenoid valve 98 having air inlet 99 and air exhaust 100 through air hoses 101 and 102 which in turn are controlled by microswitches 60 and 62. The weight of air hoses 101 and 102 resting on hoppers 38 and 40 is compensated for in each case by appropriate additional weight applied to counterweight holder 82 and 84. Belt conveyor 104 (or trough auger) serves to receive material each time one of the hopper gate valves are opened and to carry the material toward its destination through intermediate conveying means such as an additional auger or conveyor 106 which would carry the material to a point of dumping, as to a truck or freight car at a loading point. Drive means for conveyor 104 and auger 106 are conventional and are not shown.

In operation, with movable gate 42 in the position shown in FIG. 1, material applied continuously to input hopper 31 travels up auger 30 and is fed to valve assembly 20 and through passageway 50 to hopper 40, gate valve 90 being initially closed. This flow will continue until arm 76 of platform scales 10 rotates to a horizontal position, a point of balance for the increment of weights to be used. In general the largest increment permitted by the size of hoppers 38 (and 40) is set on balance arm 68 in order to keep to a minimum the number of "weighings" required to weigh out a desired total. When microswitch 62 closes four-way solenoid valve 98 is operated in a first mode to cause air and air pressure to enter at opening 108 from a supply (not shown) and to flow in hose 102 to air cylinder 46 to retract its piston 44 and move gate 42 to its opposite right side position. At the same time, air is also applied to cylinder 92 to retract its piston and close gate 96 and to apply air pressure to cylinder 86 to extend its piston to open gate 90 and permit material to commence flowing from hopper 40 into conveyor 104 which carries the material away. Thus at this point a desired increment of material, e.g 250 pounds of material, has been weighed.

While hopper 40 is thus being emptied, hopper 38 is being filled. When the weight of hopper 38 reaches a predetermined value determined by the setting of balance arm 70, microswitch 60 closes and solenoid valve 98 operated oppositely to cause each piston to reverse position and gate 42 to reverse, to cause hopper 40 to be closed, and hopper 38 to be opened and the cycle of filling and weighing is commenced again.

In this fashion material may be continuously moved from a storage or manufacturing area or enclosure to a truck, trailer or freight car for shipment and be accurately weighed as it is moved.

I claim:
1. A fluent material weighing system comprising:
   (A) first and second hoppers, each having an open top region for receiving fluent material and a gate valve positioned at the bottom of a said hopper, said first hopper including first gate valve means for selectively opening and closing its said gate valve and said second hopper including second gate valve operating means for selectively opening and closing its said gate valve;
   (B) first and second beam balance scales and each said scale having:
      (1) a supporting frame,
      (2) a weighing platform for supporting the weight of a said hopper,
      (3) a weight balancing arm connected in a lever arm relation with said weighing platform and said supporting frame and adapted to assume a balanced position when a said hopper has been filled to a predetermined weight and displaced from said balanced position when a said hopper is filled to less than predetermined weight, and
      (4) hopper supporting means supported by said weighing platform for supporting a said hopper;
   (C) a Y shaped fluent material valve having an upper input chute and first and second lower discharge chutes supported above and providing flow to said hoppers supported by said hopper supporting means;
   (D) a movable discharge gate positioned within said valve and being adapted to open said first discharge chute and close said second discharge chute when in a first position and to open said second discharge chute and to close said first discharge chute when in a second position;
   (E) first electrical switching means associated with said first beam balance scales and being responsive to said weight balancing arm of said first scales for producing a first electrical output condition when said weight balancing arm of said first scales has reached the said balanced position and a second electrical output condition when said last named weight balancing arm is displaced below said balanced position;
   (F) second electrical switching means associated with said second beam balance scales and being responsive to said weight balancing arm of said second scales for providing a first electrical output condition when said weight balancing arm of said second scales reaches said balanced position and a second electrical output condition when said last named weight balancing arm is displaced below said balanced position;
   (G) control means connected to said movable discharge gate and said first and second gate valve operating means and responsive to said first electrical output condition of said first switching means for moving said movable discharge gate from said first position to said second position, for closing said second hopper gate valve and for opening said first hopper gate valve, and responsive to said first electrical condition of said second switching means for moving said movable discharge gate from said second position to said first position for closing said first hopper gate valve and for opening said second hopper gate valve; and
   (H) conveying means positioned to receive fluent material from each said hopper through an open said gate valve and to remove said material to a point of discharge of material received from both said first and second hoppers, said conveying means being spaced from and not contacting said hoppers or weight sensitive portions of said scales.

2. The system set forth in claim 1 wherein said scales are platform scales having weighing platform and each said hopper is mounted on but suspended above a said platform.

3. The system set forth in claim 2 wherein said conveying means is positioned between said hoppers and said hoppers and said platforms.

4. The system set forth in claim 3 wherein said first and second electrical switching means each comprises a force operated, normally open, switch, mounted on a said supporting frame and being positioned to permit application of force by a said weight balancing arm when said weight balancing arm is in a balanced position.

5. The system set forth in claim 4 wherein said control means comprises a source of air, an electrically operated four-way air valve and first air cylinder for operating said movable discharge gate, a second air cylinder for operating said first gate valve, and a third air cylinder for operating said second gate valve from the output of said four-way air valve.

6. The system set forth in claim 5 further comprising an input hopper positioned below said Y-shaped valve and material transport means for lifting the material from said input hopper to the input chute of said Y-shaped valve.

References Cited

UNITED STATES PATENTS

| | | | |
|---|---|---|---|
| 287,033 | 10/1883 | Lewis | 177—98 |
| 772,446 | 10/1904 | Weyant | 177—98 |
| 895,524 | 8/1908 | Weyant | 177—98 |
| 916,582 | 3/1909 | Oppermann | 177—99 |
| 953,127 | 3/1910 | Dunkerly | 177—99 |
| 1,435,568 | 11/1922 | Westen et al. | 177—98 |

FOREIGN PATENTS

| | | |
|---|---|---|
| 62,697 | 12/1913 | Austria. |
| 565,292 | 11/1923 | France. |
| 56,739 | 5/1924 | Sweden. |

ROBERT S. WARD, Jr., Primary Examiner

U.S. Cl. X.R.

177—114